United States Patent [19]

Feinbloom

[11] Patent Number: 4,802,756
[45] Date of Patent: Feb. 7, 1989

[54] LOW VISION APPARATUS AND DEVICE AND METHOD FOR ENABLING THE VISUALLY HANDICAPPED TO VIEW TELEVISION

[75] Inventor: Richard E. Feinbloom, New York, N.Y.

[73] Assignee: Designs for Vision, Inc., Ronkonkoma, N.Y.

[21] Appl. No.: 12,627

[22] Filed: Feb. 9, 1987

[51] Int. Cl.$^4$ ............................ A61B 3/00; H04N 7/00
[52] U.S. Cl. ................................. 351/200; 358/94
[58] Field of Search ............... 351/200; 350/410, 576, 350/575, 142, 143, 146, 502; 358/93, 94

[56] References Cited

U.S. PATENT DOCUMENTS 4,330,169 5/1982 Kantor ............................ 350/410

Primary Examiner—Rodney B. Bovernick
Assistant Examiner—P. M. Dzierzynski
Attorney, Agent, or Firm—Arthur L. Plevy

[57] ABSTRACT

There is disclosed a system for improving the visual field of a handicapped person which utilizes a wide angle lens which is placed in front of an object such as a screen of a television set to be viewed. This operates in conjunction with a prism to provide a reduced image of a size which is compatible with the field of view that the handicapped person experiences due to the use of an optical aid necessary to enable the handicapped person to see with resolution. The system and method according to this invention serves to enable such a person to view a reduced image such as the image of a television screen which reduction is implemented to be of the size of the field of the optical aid that the person requires in order to see with any given resolution.

10 Claims, 5 Drawing Sheets

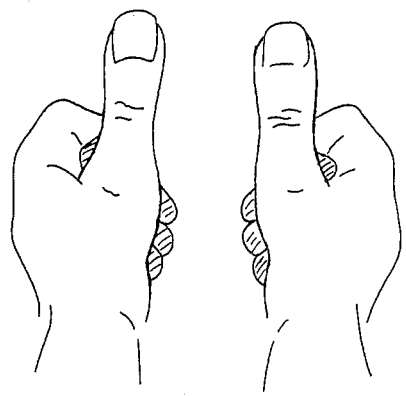
FIG. 2
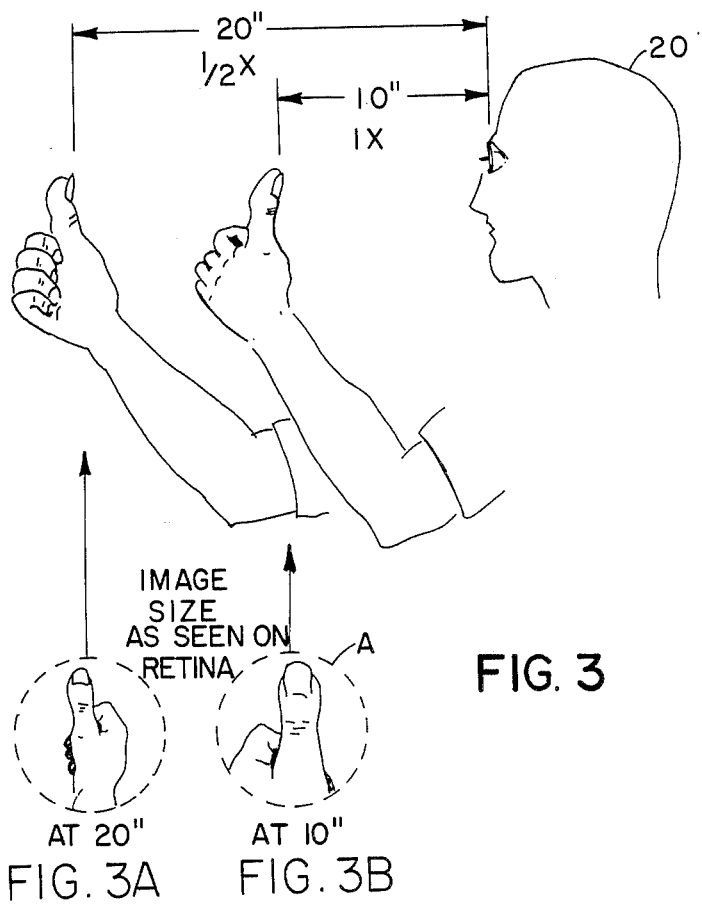
FIG. 3
FIG. 3A    FIG. 3B

FIG. 4A IMAGE SEEN

FIG. 5A IMAGE SEEN

FIG. 6
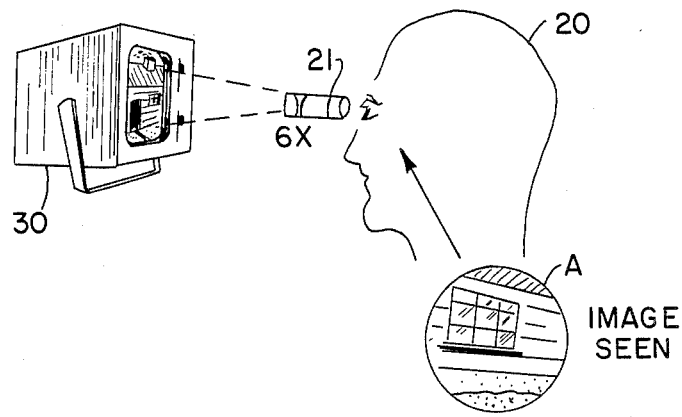
FIG. 6A
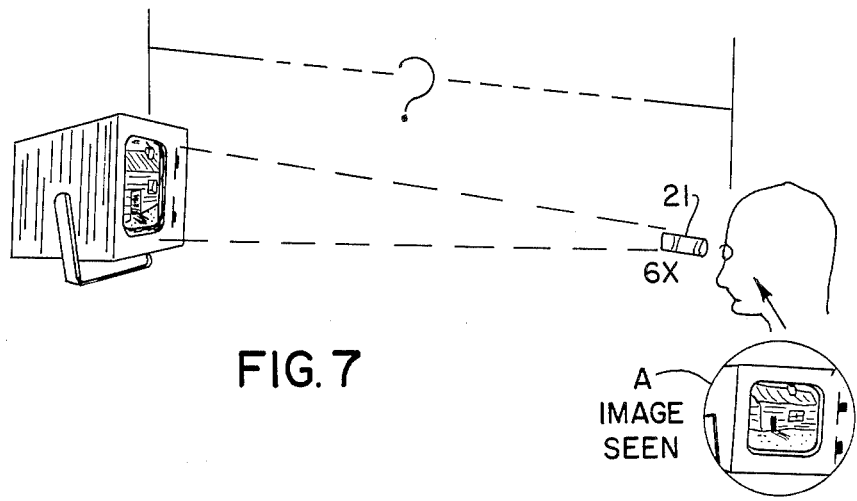
FIG. 7
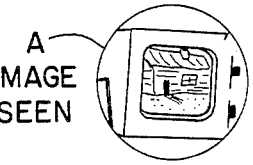
FIG. 7A

LOW VISION APPARATUS AND DEVICE AND METHOD FOR ENABLING THE VISUALLY HANDICAPPED TO VIEW TELEVISION

BACKGROUND OF THE INVENTION

This invention relates to a viewing system in general and more particularly to a system and method for improving the field of view of persons with reduced vision or those persons who are severely visually handicapped.

Unfortunately, there are many individuals in the world that have severe visual handicaps. Such individuals are partially sighted and require a large amount of magnification in order to seen and to read and in general to perform every day functions. To accommodate these individuals, various companies such as Designs For Vision, Inc., of 760 Koehler Avenue, Ronkonkoma, New York 11779, the assignee herein, supplies binocular or telescopic microscope devices which are used by such individuals to compensate for the visual defect. As such, these individuals may require full diameter telescopes which essentially are Galilean telescopes that are designed for distance tasks that are to be performed when the patient is stationary. As such, such devices are available in many different designs with powers of 1.7×, 2.2×, 3.0× and 4.0× or more.

While the full diameter telescope is generally used for distance tasks, it may be converted into a near optical aid with increased versatility by applying a reading cap over the front end of the telescope. Essentially, other patients may require bioptic telescopes which also provide the patient with the benefits of a telescopic system while still maintaining his mobility. These devices come in powers of 2.2×, 3.0×, and 4.0× and so on. Still other patients may require what is referred to as spiral expanded field prism telescopes. These telescopes give the patient maximum flexibility and use. With the larger fields, these units can be focused from true infinity to approximately 10 inches. The patient can adjust the working distance by focusing the objective lens. These are available in powers up to 10 times, as for example, 2.0× to 10.×.

In any event, a major problem that is encountered is that as the magnification is increased in any of these devices, the patient's field of view decreases accordingly. It is understood that all magnification reduces the field of view. For example, if a patient requires 14× magnification in order to read, the field of view is about the size of a thumbnail or about ½ inch × ½ inch. This individual, in order to read, must hold the paper about 1inch from his optical aid. It is thus apparent that such individuals cannot easily view television or read without great difficulty.

As one can ascertain, in regard to the above-noted optical aids the field of view decreases in direct proportion to magnification. For example with the expanded field spiral focus telescope a patient will have a field of view with a 5.0× magnification of approximately 8 degrees. The field of view of an 8.0× magnification decreases to 4 degrees. As one can therefore ascertain, by such reductions in the field of view which are inherent in utilizing such optical aids, the patient is severely handicapped in regard to his field of view and thus cannot watch television or read without holding or positioning himself in front of the television or paper to enable him to accommodate the restrictive field of view while enabling him to accurately view the subject matter.

For a further explanation of such devices reference is made to a technical manual entitled *Optical Aids for the Partially Sighted*, published by Designs For Vision, Inc., the assignee herein. In regard to this manual which consists of approximately 70 pages there are detailed descriptions of each of the optical aids as described above together with the limitations on the field of view which as indicated above varies according to the magnification required by the patient.

In any event, the prior art is aware of problems regarding the limited field of view and regarding in general the problems of the visually handicapped. As such, there has been a host of articles and various other documents present in the prior art which attempt to teach the partially sighted to utilize optical aids such as binoculars and telescopes in order to enhance their visual problems. For example, see an article entitled "Binoculars: A Long Ignored Aid For The Partially Sighted", published in the *American Journal of Optometry and Physiological Optics*, Volume 51, September 1974 by Samuel M. Genensky, The Rand Corporation, Santa Monica, Calif., pages 648–673.

This article advises the partially sighted in the use of visual aids which are ordinary binoculars and telescopes to enable such visually handicapped persons to view various objects such as street signs and so on.

Other U.S. Patents such as U.S. Pat. No. 3,171,884 which issued on Mar. 2, 1965 to J. R. Miles and is entitled A MAGNIFIER HAVING A RELATIVELY LARGE FIELD AND EYE RELIEF also shows various optical systems in order to enable visually handicapped persons to view with more proficiency. As one will ascertain, the problem with the use of such optical aids as conventional telescopes or binoculars is that such devices also severely limit the field of view. Thus, as explained in such articles, a handicapped user who uses and requires a microscopic aid can only view an object if the object is held very close to his eyes as for example ½ inch or so. In these articles as for example the above-noted article of Genensky, it is indicated that the visually handicapped user first sight the object or area that he wishes to view along the upper edge of the center line of the binoculars or along the upper edge of one of its optical trails or paths. Then the handicapped user without moving this head is to bring the binoculars up to his eyes. Usually this procedure guarantees that at least part of the object area of interest would be in the field of view of the binoculars or very close to that field of view.

Thus, as one can ascertain from the various prior art, a person wearing a microscopic optical aid cannot function to utilize binoculars or telescopes to any great degree. The person cannot view the distant object unless it is held approximately ½ inch away from his eyes or from the microscopic aid. In any event, if he could do this, all he would receive is part of the object or area of interest. In any event, in order to view any distant object using conventional telescopes or microscopes, the person must constantly scan the object or move the additional aids such as the binoculars or telescopes. This is also clearly described in the above-noted article or in various other references.

It is therefore an object of the present invention to provide a viewing system and method of viewing to enable visually handicapped individuals to watch television in a convenient manner at a reasonable distance from the television screen.

It is a further object of this invention to allow a visually handicapped user to view a distant object which object is completely reduced in regard to image size so that the complete object can be reviewed totally in a reduced size.

As will be explained, in the applicant's device, there is no increase in the visual angle but there is an actual decrease in the complete size of the remote image.

It is a further object of this invention to provide apparatus which is placed in front of a distant object to enable a visually handicapped user to view a complete image of the distant object at a reduced size with optimum resolution.

It is a further object of the present invention to enable a person who is visually handicapped and who requires an optical aid to view the complete distant object by taking the distant object such as a television screen and minifying the same to fill the effective field of view of the handicapped person as caused by the optical aid as worn by that person.

These and otehr objects of the invention will become more apparent when reference is made to the following specification.

BRIEF SUMMARY OF THE INVENTION

There is disclosed a system and method for improving the visual field of a handicapped person which utilizes a wide angle lens which is placed in front of an object such as a television screen to be viewed.

A handicapped person is a person who is visually handicapped and requires a microscope or telescopic aid to be worn. The wide angle lens operates in conjunction with a prism to provide a reduced image of a size which is completely compatible with the field of view that the handicapped person experiences due to the use of the optical aid worn and necessary to enable the handicapped person to see.

Essentially, the system and method according to this invention serves to enable such a person to view a reduced image which reduction is implemented to be of the size of the field of the optical aid used in order to enable the person to see the complete television picture with maximum resolution.

It will be understood that there is no system presently available which produces a reduced image at good resolution to substantially fill the field of view of a handicapped user when wearing an optical aid which undesirably reduces his field of view.

BRIEF DESCRIPTION OF THE FIGURES

FIG. 2 is a diagrammatic view of the right and left hands of a patient seen from a given distance and used to describe the operation of this invention.

FIG. 3 is a side view showing a patient looking at his two hands at different distances without an optical aid to show the effect of linear magnification and an unrestricted field of view.

FIG. 6 is a side view showing a patient viewing a screen of a television receiver through an optical assembly.

FIG. 7 is a side view showing a patient viewing the screen of a television receiver through an optical aid at a distance which will enable him to see the entire screen but with a reduced resolution and image size

DETAILED DESCRIPTION OF THE FIGURES

Figure 1:
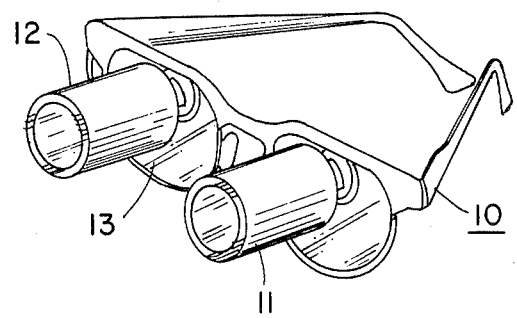
FIG. 1 is a perspective plan view of a typical optical aid required to be worn by a visually handicapped user to be aided by the techniques of this invention.

Referring to FIG. 1, there is shown for example an optical aid 10 which is typical of the type worn by those who are visually handicapped.

The optical aid 10 essentially consists of a regular eyeglass frame having spectacle or lenses 13 mounted therein which lenses or spectacles accommodate two telescopic aids 11 and 12. As indicated, such an optical aid may consists of a spiral expanded field prism telescope (a terrestrial telescope) which gives the patient maximum flexibility and use with the fields larger than those in the comparably powered full diameter or bioptic telescopes, these units as 10 are focusable from true infinity to approximately 10 inches. The patient can adjust the working distance by focusing the objective lenses.

For closer than 10 inches a reading cap or an additional lens is utilized with such a telescope. Telescopes are available in powers 2.0× to 10× for example. Essentially, such optical aids appear similar to that device shown in FIG. 1 and must be worn by the visually handicapped to enable him to perform conventional tasks and enable him to see under ordinary circumstances. As indicated above, the field of view of the patient becomes severely restricted which restriction of the field of view is a function of the magnification or power of the particular device. It will be understood that the methods and techniques to be described will work efficiently whether the patient requires a microscope or telescope aid. The major difference being in the distance the patient's eyes are positioned with respect to the generated reduced image.

For example for a 4.0× magnification, the patient has an effective field of view of about 9 degrees wherein for an 8.0× the patients effective field of view is 4 degrees. Essentially, as indicated above, the prior art is cognizant of such limitations of field of view and did not in any manner produce any device which enabled a person who was required to wear such an optical aid assembly to view or watch television. As one can ascertain, the watching of television in today's society is a requirement which enables a person to keep up with current events as well as the entertainment aspects of television.

In any event, such visual handicapped users, in order to see television, have to sit practically on top of the television set and must essentially scan the screen in order to see. There is a substantial problem which is inherent with magnification in regard to resolution and field of view. In any event, the system and method to be described herein circumvents the problems of the prior art as will be further explained.

Referring to FIG. 2, there is shown a diagrammatic view of the thumbs of a person viewed from the left and right hands. When one discusses linear magnification, one is discussing the relationship of the object viewed to the image size on the retina. This is exactly what the patient sees.

In reference to FIG. 2, wer are assuming that both thumbs are held at 10 inches from the eye and provide an image which as shown in FIG. 2 is of the same exact size. This is the image that is seen at the retina.

Referring to FIG. 3, there is shown a person 20 holding his left hand 10 inches from his eye while the right hand is held at 20 inches from the eye. As seen from FIG. 3, at 10 inches, one sees a given thumb size. At 20 inches, the patient or person 20 sees the thumb size of one half as at 10 inches. These are the images seen on the person's retins at the approximate distances of 10 and 20 inches.

As one can ascertain from viewing FIG. 3, the image size at the regina of the eye at 20 inches is one half of the image size at the retina at 10 inches. The eye doctor typically prescribes the amount of magnification needed by the patient at his retina size in order to correct his visual defect. In any event, when prescribing proper magnification, there is an undesirable loss of the field of view. Hence, eye doctors mainly are concerned with magnification, and hence, the patient always suffers a reduced field of view. In FIG. 3, the patient's field of view is unrestricted as evidenced by the dashed lines due to the fact that he has no limitations imposed by an optical aid.

Figure 4:
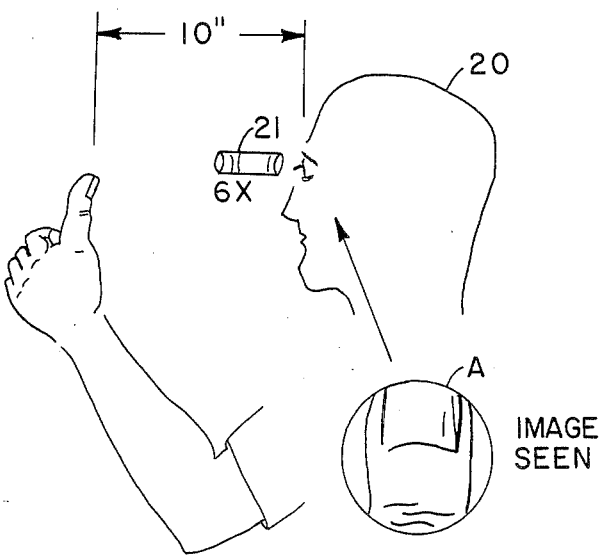
FIG. 4 is a side view showing a patient viewing one hand at a given distance through an optical assembly.
Figure 5:
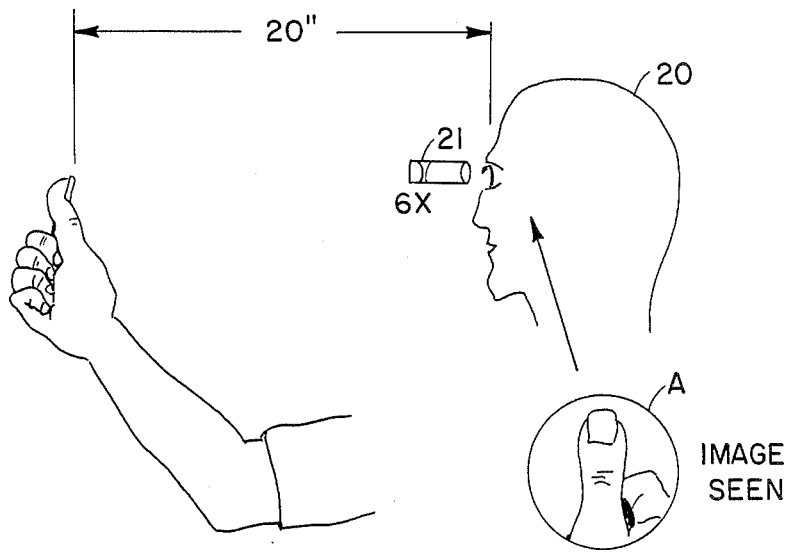
FIG. 5 is a side view showing a patient viewing one hand at another distance through the same optical assembly.

Referring to FIG. 4, there is shown the person 20 viewing the thum area at a distance of 10 inches again but with the use of an optical aid 21 having a 6× magnification. The field of view the person sees is extremely restricted. As one can ascertain from the circled portion of FIG. 4, the field of view now encompasses a portion of the thumb nail with a portion below. This is exactly what occurs when the patient views his thumb at the distance of 10 inches which is analogous to FIG. 3 where the same view is shown in A with the exception that the telescope severely limits the field of view. In any event, referring to FIG. 5, there is again shown the person 20 holding his thumb at a distance of 20 inches and again viewing the distant object or viewing his hand and thum via the telescopic aid 21. At 20 inches, the linear magnification becomes 3× yet the system still magnifies 6×. This is the retinal image size that the eye doctor prescribes. The field of view as shown in A of FIG. 5 is twice the size as the field of view as shown in FIG. 4. Hence as one can ascertain, by the distance and use of the same optical aid 21, one has increased the field of view 2× by essentially moving the object twice the distance. In any event, the retinal image size of the patient has been reduced by one half.

Referring to FIG. 6, there is shown a person 20 viewing a television screen 30 via the optical aid 21. When the 5 inch television screen is viewed with a 6× telescope 21, the patient receives magnification as shown in FIG. 6A but receives an extremely restricted field of view. Hence as shown in FIG. 6, diagrammatically, the patient will see the television screen but will see for example the window portion of the house which is portrayed on the screen.

Referring to FIG. 7, if the patient now wishes to view the television screen via the optical aid 21, the distance that the patient moves is an arbitrary distance indicated by a question mark. As the patient moves farther and farther away from the television screen, he will be enabled to see the entire screen as shown in FIG. 7A. In any event, the iamge as seen on the patient's retina is too small to enable him to obtain any adequate resolution and therefore even utilizing the optical aid 21, the patient still cannot appreciate the picture on the television screen.

Figure 8:
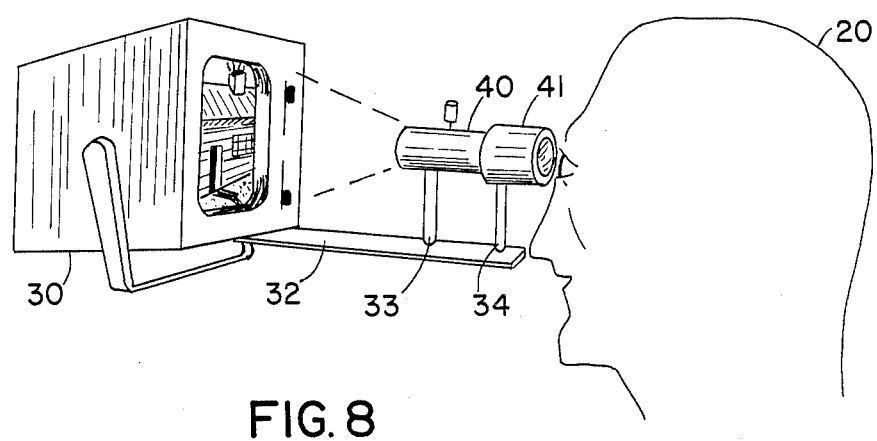
FIG. 8 is a side view showing a patient viewing a television screen through apparatus at a known distance and image size by using the method according to this invention.
Figure 8A:
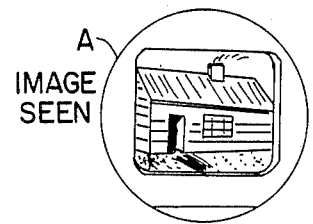

Referring to FIG. 8, there is shown a system according to this invention. As shown in FIG. 8, there is a television receiver 30 having a screen located thereon. Secured to the receiver is a bracket 32 which bracket supports by means of posts 33 and 34 an optical assembly. The optical assembly consists of a first lens system 40 and a second lens system 41. The lens system 41 is that exact system as would be utilized by the visually handicapped patient as for example shown in FIG. 1. Essentially, the lens assembly 41 consists of the lens assemblies as 11 or 12 which lens assembly is associated with a further lens assembly 40 which essentially will be described and is part and parcel of this invention. By positioning the lens assemblies 40 and 41 on the bracket 32 by means of posts 33 and 34, one selects the exact distance for the patient 20 to enable the patient to view the image as shown in FIG. 8A. As one can ascertain, the image depicted in FIG. 8A is the full image of the entire television screen presented to the patient or the visually handicapped user in a manner to exactly fill the entire retina. In this manner the patient then receives a high resolution image of the entire television screen as shown for example in FIG. 8.

Figure 9:
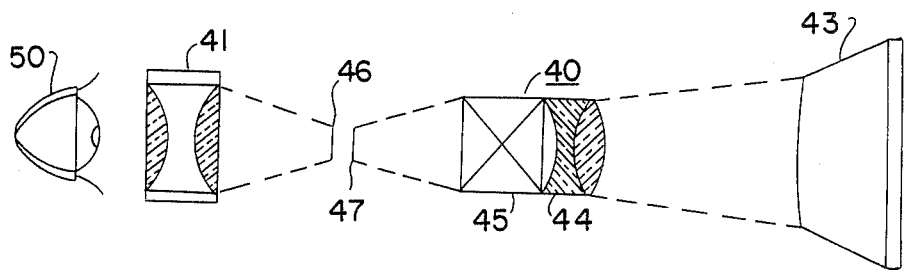
FIG. 9 is an optical depiction of the apparatus and methods according to this invention.

Referring to FIG. 9, there is shown the optical assembly which is associated with the system depicted in FIG. 8. The lens assemblies 40 and 41 are shown in FIG. 9.

Referring to FIG. 9, there is shown the eye 50 of a visually handicapped person. As explained, the person requires a microscope or telescopic assembly 41 which is positioned in front of his eye 50 or is required in front of both eyes for the patient to see with any resolution. The microscope or telescope assembly 41 provides a magnification which is necessary to accommodate the particular visual defect of the patient. As such, the magnification required by the patient determines the power of the optical aid 41.

As is understood, this may vary from patient to patient. In any event, in the above example a patient may typically require a 14× magnification from the assembly 41 and hence his visual field which is depicted by reference numeral 46 will be about ½ inch by ½ inch. As one can ascertain, the magnification of this microscope assembly or a visual aid as 41 is determined by the diopter power of the two lenses to give a magnification of 14.

The field of view is the area measured horizontally that the eye 50 sees with the person's head in the primary position. The eye 50 fixed on a central object scanning the two most outer edges and keeping the eye stationary to this measurement geometrically figures into the angle which is the field of view. The prescribed magnification which is prescribed by a eye doctor to a visually handicapped user is the amount of magnification the patient needs to function normally. The power of a lens in diopters is determined by using the formula F=M/D. M is the distance of one meter or 40 inches over diopters. For example, a lens with a focal length F of 35 mm indicates that M=1000 over D. Hence, 35 D=1000 and D=+28 diopters rounded off. This would be the power of the objective lens. Magnification can be converted into high plus diopters. One X is equal to 4 diopters so a 14× optical aid as 41 is equal to 56 diopters because 14×4=56. If one uses a 14× microscope for the eyepiece and a 35 millimeter focal length lens for the objective, the power of the system is 56 divided by 28 which is roughly a 2× system. A telescopic system is a telescope when the focal length of the objective meets the focal length of the eyepiece. The system is then par focal and one can see through it.

The patient's eye 50 with the use of the optical aid 41 will only be able to see a field 46 of ½ inch and he must hold an object to be viewed about 1 inch from the front of the optical aid 41 output and at best can only view a portion of the entire object at one time. According to the technique as shown in FIGS. 8 and 9, the object 43 which is a television screen to be viewed is reduced so that its image occupies the effective field size 46 of the optical aid 41. For example, the object 43 which is the screen of a television receiver has placed in front of the object the lens system 40. Essentially, the lens system 40 consists of a wide angle lens 44 such as the type of lens utilized in photography and related fields. The lens system 40 is followed by an optical prism 45 which serves to properly orient the image 47 of the television screen 43 which is now viewed via the optical aid 41 by the eye of the patient 50. In this manner the described system serves to reduce the image down to the size of the field of view of the optical aid 41 to enable the patient to view it with his optical aid.

Accordingly, the patient can now view the entire picture content or page within his limited field of view as for example shown in FIG. 8. The above description should make it clear that the wide angle lens 44 can be of varying focal lengths. The main purpose of the same is to provide a reduced image 47 of a size compatible with the field of view of the microscope or optical aid 41. By using the above technique, various magnification ranges can be accommodated as depending upon the visual handicap for example 4×, 5×, 6× and so on. The system recognizes the fact that because the patient requires magnification to see, his field is severely limited. Hence in order for him to see the entire image at the right magnification, the invention serves to completely fill his field of view as limited by the optical aid.

As indicated, wide angle lenses as 44 are in common use and generally consist of a convergent lens arrangement and a divergent lens arrangement. There are a great many variations of such lens arrangements which are commercially available. In order to erect the image, a prism 45 is employed. The technique of providing the erect image from the inverted image is also well known and employed in prismatic binoculars which require reversal of the image due to the optics employed. The combination of the wide angle lens assembly 44 and the prism system 45 can be accommodated in a separate holder as holder 40 which includes the cylindrical tube which may be secured as shown via the posts 33 and 34 to the bracket 32. The bracket 32 can be moved accordingly in order to accommodate the particular magnification for each patient.

As seen in FIG. 8, the optical aid 41 is also preferably built into the assembly and appears in front of the optical assembly 40 to allow the patient to look through the optical aid 41 which essentially is completely analogous to that optical aid required by the patient for normal viewing. In practice a wide angle lens having a focal length of 35 millimeters is employed together with a prism 45. The system described was used and tested on various persons having visual handicaps. These people experienced a significant improvement in their ability to read and view television.

As can be discerned, there may be many modifications of such systems. Thus, the above describes a new concept for low vision patients. The system described is a device and a method through which the optical laws allow low vision patients to view at a convenient distance an image which he cannot view under normal circumstances such as the image of a television screen.

Thus, a patient having a prescription which requires 6, 8, 10, 12 or 14× magnification can use the system with a 2× magnification to allow him to see a television from a convenient distance. Physicians today feel that a patient with low vision sees television because they sit very close to the set. However, by using this system, this is not true and the patient can sit far from the set as convenient and still see the entire picture with extreme clarity.

It is therefore felt that this specification describes a new concept which enables low vision patient's to perceive objects such as television which they could not perceive in a normal manner based on all prior art techniques as presently known.

What is claimed is:

1. A method for enabling a visually handicapped person to view a television screen with resolution and to view the entire screen, said person having a visual handicap requiring the wearing of an optical aid which undesirably limits said person's field of view where the magnification of the optical aid as worn by said person requires said person to position the eye of said person when accommodating the optical aid very close to said screen which therefore severely restricts said person's field of view, the method herein permitting said person to view said screen at a convenient distance when said person is accommodating said optical aid, comprising the steps of:

placing an assembly in front of said screen at a distance to provide a complete image of said screen at a reduced size, with said reduced size image substantially occupying the field of view of said person as determined by said optical aid as accommodated, inverting said reduced image to enable said person to view said reduced image via said optical aid at a convenient distance with said reduced image substantially occupying said person's entire field of view as limited by said aid to enable said person to view said screen with optimum resolution.

2. The method according to claim 1, wherein said optical aid provides a magnification of 14× wherein said field of view is about ½ inch by ½ inch.

3. A method of enabling a visually handicapped person to view a television screen with optimum resolution, said person having a visual handicap requiring said person to wear an optical aid providing a given magnification which severely limits said person's field of view according to said magnification comprising the steps of:

forming a complete image of said screen at a given plane, said image formed at a reduced size substantially equal to the size of said restricted field of view as afforded by said optical aid, placing said optical aid used by said person at said plane to enable said person to view said reduced image by viewing the same via said aid.

4. The method according to claim 3, wherein the steps of forming said complete image includes, placing a wide angle lens in front of said screen to provide a complete image of said screen at said reduced size, inverting said image to enable said person to view said reduced image via said optical aid in an inverted position.

5. The method according to claim 4, wherein the step of inverting said image includes placing a prism after said wide angle lens.

6. The method according to claim 4, wherein said reduced image is reduced to a size according to the magnification power of said aid.

7. An apparatus for enabling a visually handicapped person to view a television screen associated with a television set and to view a complete image of said screen with good resolution to enable said person to accurately perceive the events depicted on said screen, said person having a visual handicap requiring said person to see by the use of an optical aid providing magnification of images but which aid undesirably limits said person's field of view according to the amount of magnification provided providing:

lens means coupled to said television set positioned in front of said screen and operative to provide a substantially reduced complete image of said screen at a given plane, with said image reduced to a size according to the restricted field of view of said handicapped person to substantially fill said field of view as restricted by said aid, and means coupled to said lens means for inverting said reduced iamge for enabling said person to view said screen via said optical aid.

8. The apparatus according to claim 7, wherein said lens is a wide angle lens.

9. The apparatus according to claim 8, wherein said lens is a 35 mm lens.

10. The apparatus according to claim 7, wherein said means for inverting said reduced image is a prism.

* * * * *